(12) United States Patent
Candelore

(10) Patent No.: US 9,201,886 B2
(45) Date of Patent: Dec. 1, 2015

(54) MANAGING REDUNDANT CONTENT LICENSES IN HOME NETWORK

(75) Inventor: Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 1138 days.

(21) Appl. No.: 12/871,513

(22) Filed: Aug. 30, 2010

(65) Prior Publication Data

US 2012/0054151 A1 Mar. 1, 2012

(51) Int. Cl.
 *G06F 17/30* (2006.01)
 *G06F 21/10* (2013.01)

(52) U.S. Cl.
 CPC .... *G06F 17/30082* (2013.01); *G06F 17/30286* (2013.01); *G06F 17/30575* (2013.01); *G06F 21/10* (2013.01)

(58) Field of Classification Search
 CPC .............. G06F 17/30082; G06F 17/30575; G06F 17/30286; G06F 17/30067
 USPC ............... 707/609, 610, 661, 705; 705/57
 See application file for complete search history.

(56) References Cited

U.S. PATENT DOCUMENTS

| 7,500,269 | B2 * | 3/2009 | Huotari et al. ................. 726/27 |
| 2006/0149676 | A1 | 7/2006 | Sprunk et al. |
| 2006/0159109 | A1 * | 7/2006 | Lamkin et al. ................. 370/401 |
| 2006/0294145 | A1 * | 12/2006 | Saunders et al. ............. 707/806 |
| 2007/0270307 | A1 * | 11/2007 | Hamasaki et al. ............ 502/418 |
| 2008/0148363 | A1 | 6/2008 | Gilder et al. |
| 2008/0148414 | A1 * | 6/2008 | Tom ............................... 726/29 |
| 2008/0270307 | A1 | 10/2008 | Olson et al. |
| 2009/0313353 | A1 * | 12/2009 | Lou ............................... 709/219 |

\* cited by examiner

*Primary Examiner* — Shahid Alam
(74) *Attorney, Agent, or Firm* — John L. Rogitz

(57) ABSTRACT

Multiple DRM-employing home files of the same content are "cleaned up" for archiving by copying licenses attached to one copy of content to an archived copy of the content for a user's home domain, or, when multiple copies are desired to remain extant, by copying all licenses associated with various copies to each copy of the content.

18 Claims, 1 Drawing Sheet

MANAGING REDUNDANT CONTENT LICENSES IN HOME NETWORK

FIELD OF THE INVENTION

The present application is directed to managing redundant content licenses in a home network.

BACKGROUND OF THE INVENTION

Home entertainment systems employ multiple devices throughout the home that are networked with each other in a home network. For example, a proposed standard known as the Digital Entertainment Content Ecosystem (DECE) envisions up to twelve devices sharing content with each other in a home network.

As understood herein, each device may have its own digital rights management (DRM) scheme executed by a controller, typically a processor of the device programmed to adhere to various rules related to content copying, content play, etc. Licenses for each DRM scheme can be bound to content provided to the respective device in a data "container" by a Digital Service Provider (DSP) before delivery. In some cases, licenses can be requested and bound to the content on an as-needed-basis.

In any case, as recognized herein, owing to the several devices in a home system, files of essentially the same content can proliferate in the home system but file with its own unique license attached to it. As further recognized herein, this complicates archiving within the home a single file with all the requisite licenses attached. In other words, because many people copy music or movies to devices temporarily as it is being consumed, and because these files later may be erased with a master copy preserved in a master repository, present principles understand that unless the licenses can be centralized in a single file, when the content subsequently is played, the device attempting to play it may not possess the requisite license and the content consequently will not play.

SUMMARY OF THE INVENTION

Accordingly, a control component for home network storing first and second copies of a content file is disclosed. Each copy is associated with a respective license. The control component includes a processor accessing a tangible non-transitory computer readable storage medium which stores logic causing the processor to access the first and second copies of the content file. Each license is unique to its respective copy and is different from licenses of other copies of the content file. The processor identifies the first and second copies as being duplicate copies of the content file and responsive thereto associates at least both of the licenses with at least one single copy of the content file.

In some examples the logic causes the processor to archive the single copy and delete all other copies of the content file. In other examples the logic causes the processor to deliver the single copy to at least one other component which replaces a copy of the content file with the single copy. In this latter example all copies of the content file can be deleted on the delivered-to component except the single copy.

In some implementations the license of the first copy is associated with the second copy and the license of the second copy is associated with the first copy. The component can manage copies of content in a home network and may identify duplicate copies during a system backup operation.

In another aspect, a method includes receiving a user selection of a content file to be played on a player component including a processor and a tangible non-transitory computer readable storage medium. The method also includes accessing a copy of the content file having at least first and second digital rights management (DRM) licenses associated therewith and identifying which of the first and second licenses is associated with a DRM scheme implemented by the component. The license associated with the DRM scheme implemented by the component is selected to enable the component to play the content file in accordance with the DRM scheme.

In another aspect, a processor is disclosed in a home network. The home network includes first and second components storing, on respective tangible non-transitory computer readable storage media, respective first and second copies of a piece of content. The first and second copies are of the same piece of content and are associated with respective first and second digital rights management (DRM) licenses that are different from each other. The processor manages content in the network by establishing at least one master copy of the piece of content in the home network at least in part by associating the master copy with the first and second licenses.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Present principles apply to managing multiple licenses on copies of the same content, such as music, ebooks, movies, and the like, in a home network.

Figure 1:
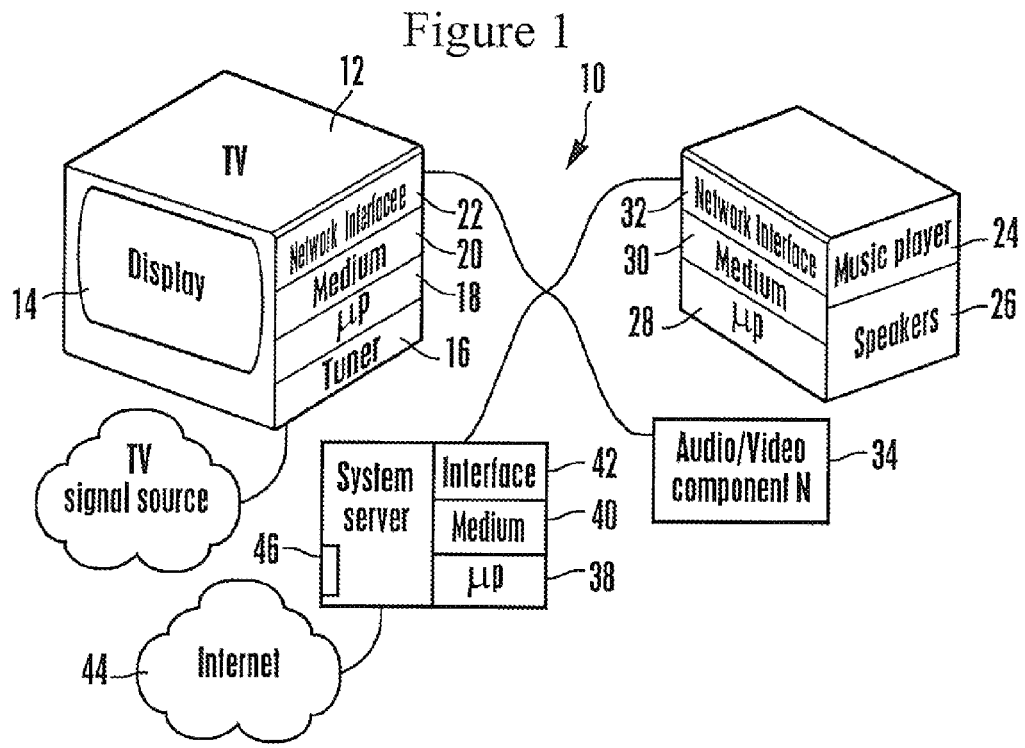
FIG. 1 is a block diagram of an example system in accordance with present principles.

Referring initially to FIG. 1, a home network 10 includes multiple player components that communicate with each other over wired and/or wireless links. The components of the network 10 may include a TV 12 bearing a TV display 14 such as a standard definition and/or high definition matrix display. The display 14 presents video from a TV tuner 16 which may be in the TV 12 as shown or which may be implemented in a separate set-top box. The TV tuner 16 receives TV signals from one or more TV sources including satellite receivers, cable head ends, and terrestrial broadcast transmitters.

A TV processor 18 communicates with the TV tuner 16 and with the display to control presentation on the display. The TV processor 18 accesses one or more computer readable storage media 20 such as but not limited to disk-based and/or solid state storage to execute instructions thereon. The TV processor 18 may also communicate with one or more network interfaces 22 within the TV 12. The network interface 22 may be, without limitation, an interface for communicating with a wide area network and/or a local area network and may be implemented by a wired or wireless modem, Ethernet interface, 802.11 interface, or other appropriate interface.

Additional components in the home network 10 may include a music player 24 with audio speakers 26 controlled by a music processor 28. The music processor 28 can access one or more computer readable storage media 30 to play music on the media 30 over the speakers 26. The music processor 28 can also communicate with other components in the network 10 through a network interface 32. Additionally, one or more additional player components 34 such as, e.g., other TVs, music players, home theaters, game consoles, etc. can be part of the network 10 as shown.

The network 10 may also include a home network server 36 that includes a server processor 38 accessing server storage media 40. The server 36 communicates with the other components in the network through a server network interface 42. The server 36 may also communicate with the Internet 44 through a wired or wireless Internet interface 46 such as a modem. The server 36 may be instantiated separately as shown by, e.g., a router apparatus, personal computer, set-top box, or other component or may be integrated with the TV 12/music player 24/component 34.

In any case, the various components of the home network 10 may download content from both the TV signal source and Internet 44, and some of the content may have a DRM license attached to it in a content "container". Furthermore, two or more components in the network 10 may download the same piece of content independently of each other, and because of this the two (or more) copies of the same content within the home network 10 may each have its own unique DRM license, either because each component employs a DRM scheme that is different from those employed by other components and/or because the mere act of downloading two copies of content independently of each other results in two different licenses for the copies.

Figure 2:
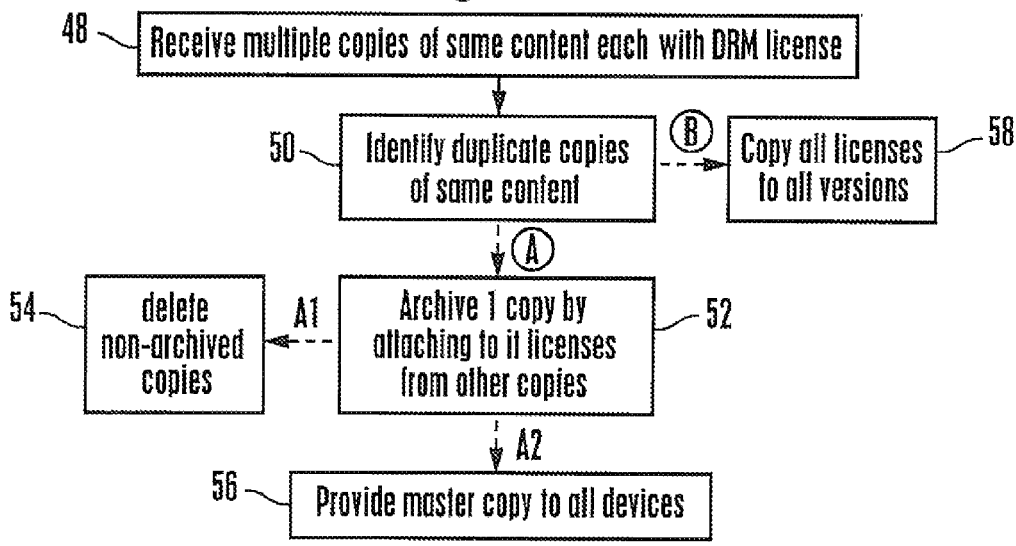
FIG. 2 is a flow chart showing various embodiments of the license management logic.

Regardless of the reason for having multiple copies of the same content with each copy having its own unique license, present principles for managing this state of affairs may be seen in reference to FIG. 2. Commencing at block 48, multiple copies of the same content (i.e., the same piece of music as embodied in a music file, the same movie as embodied in a video file, etc.) are received, each with its own DRM license associated with it as by, e.g., encapsulating both content and license in a software "container". For present purposes assume that each copy of the same piece of content has a license that is unique to that copy and different from the licenses of the other copies of that piece of content.

Proceeding to block 50, duplicate copies of the same piece of content within the home network 10 are identified. This identification may occur periodically, and/or upon user command input at, e.g., the TV 12, and/or upon other triggering event such as, for instance, a manual or automatic backup operation of content on the network 10 to, e.g., the storage 40 in the server 36. The identification may be performed by a software agent executed by a processor of any of the components shown in FIG. 1, examining the storages of the other components in the network 10.

In some embodiments, as represented by flow line "A" the logic may proceed from block 50 to block 52 in which a single copy (which becomes the "master" copy) of the content is archived, with all licenses of other copies of that content being attached to the master copy. In other words, if three copies of a piece of content exist in the network 10, each with its own license, a master copy of that content will be encapsulated or otherwise associated with all three licenses. If desired, as indicated by flow line "A1", all copies of the same content except the archived master copy of that content can be deleted at block 54. Or, as indicated by flow line "A2", the master copy with all licenses attached to it may be re-delivered at block 56 to other components on the network 10, replacing the other versions of the content in those components. Both blocks 56 and then later block 54 may be executed.

In yet other embodiments, as shown by flow line "B" the logic may move from block 50 to block 58 to copy the various licenses between the various copies of the same piece of content, making all containers of the content the same within the network 10. Essentially, the difference between blocks 56 and 58 is that in block 56 a single master copy of the content is established, all licenses appended to it, and then the resulting multi-license container of the master copy provided to other network 10 components, whereas in block 58 only the licenses are copied and distributed in the network 10 and inserted into the content containers of the various components.

Figure 3:
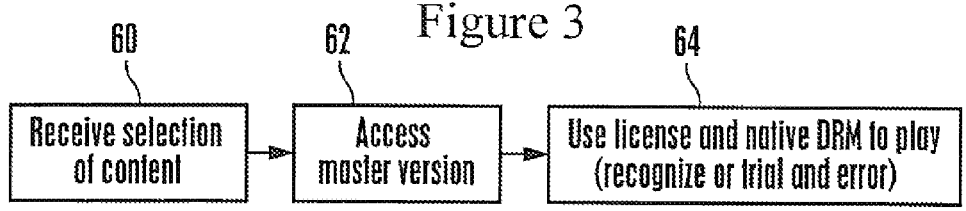
FIG. 3 is a flow chart showing example logic used by a networked device to play the master copy.

When a user wishes to play a piece of content using one of the components in the network 10, at block 60 in FIG. 3 the user's selection of the content is received. The selection may be made by means of a user interface (UI) presented on, e.g., the TV display 14 listing available content. In any case, at block 62 the master version of the content is accessed by the processor of the component being used and the license is selected from the multi-license container of the master copy that is appropriate for the DRM scheme implemented by the selected component at block 64. The content is then played in accordance with the component's DRM scheme.

It is to be understood that when all components have been provided with a copy of the content which is encapsulated with all licenses related to the particular piece of content in the network 10 (i.e., when blocks 56 or 58 in FIG. 2 are valid), the "master" copy accessed by the component at block 62 is simply the multi-licensed version of the content available at the component. On the other hand, when only a single master copy exists in the network with all other copies having been deleted at block 54 of FIG. 2, the component being invoked by the user accesses the archive storage of the network to retrieve the master copy.

While the particular MANAGING REDUNDANT CONTENT LICENSES IN HOME NETWORK is herein shown and described in detail, it is to be understood that the subject matter which is encompassed by the present invention is limited only by the claims.

What is claimed is:

1. Control component for home network storing first and second copies of a content file, each copy associated with a respective license, comprising:
   processor;
   computer readable storage medium accessible to the processor and storing logic causing the processor to:
     access the first and second copies of the content file, each license being unique to its respective copy and different from licenses of other copies of the content file;
     identify the first and second copies as being duplicate copies of the content file; and
     responsive to identifying the first and second copies as being duplicate copies, associate at least both of the licenses with at least one single copy of the content file.

2. The component of claim 1, wherein the logic causes the processor to:
   archive the single copy and delete all other copies of the content file.

3. The component of claim 1, wherein the logic causes the processor to:
   deliver the single copy to at least one other component which replaces a copy of the content file with the single copy.

4. The component of claim 3, wherein all copies of the content file are deleted except the single copy.

5. The component of claim 1, wherein the license of the first copy is associated with the second copy and the license of the second copy is associated with the first copy.

6. The component of claim 1, wherein the component manages copies of content in a home network.

7. The component of claim 1, wherein the processor identifies duplicate copies during a system backup operation.

8. Method comprising:
   receiving a user selection of a content file to be played on a player component including a processor and a computer readable storage medium;
   accessing a copy of the content file having at least first and second digital rights management (DRM) licenses associated therewith;
   identifying which of the first and second licenses is associated with a DRM scheme implemented by the component;
   selecting the license associated with the DRM scheme implemented by the component to enable the component to play the content file in accordance with the DRM scheme.

9. The method of claim 8, wherein the content file is encapsulated with the first and second licenses.

10. The method of claim 8, wherein the content file is accessed from a component in a home network other than the component selected to play the content file.

11. In a home network comprising first and second components storing, on respective computer readable storage media, respective first and second copies of a piece of content, the first and second copies being of the same piece of content, the copies being associated with respective first and second digital rights management (DRM) licenses different from each other, at least one processor executing logic comprising:
   managing content in the network by establishing at least one master copy of the piece of content in the home network at least in part by:
      associating the master copy with the first and second licenses.

12. The processor of claim 11, wherein the master copy is the first copy and the processor associates the second license with the first copy.

13. The processor of claim 11, wherein the master copy is the second copy and the processor associates the first license with the second copy.

14. The processor of claim 11, wherein the master copy is neither the first nor second copy and the processor copies both the first and second license and associates them with the master copy.

15. The processor of claim 11, wherein the processor establishes one and only one master copy in the network.

16. The processor of claim 11, wherein the processor establishes a master copy at each of the first second components.

17. The processor of claim 11, wherein the processor archives the master copy and delete all other copies of the content.

18. The processor of claim 11, wherein processor delivers the master copy to at least one component which replaces a copy of the content file with the master copy.

* * * * *